May 2, 1961        E. N. MEAKIN        2,982,029
HORIZONTAL COOLER

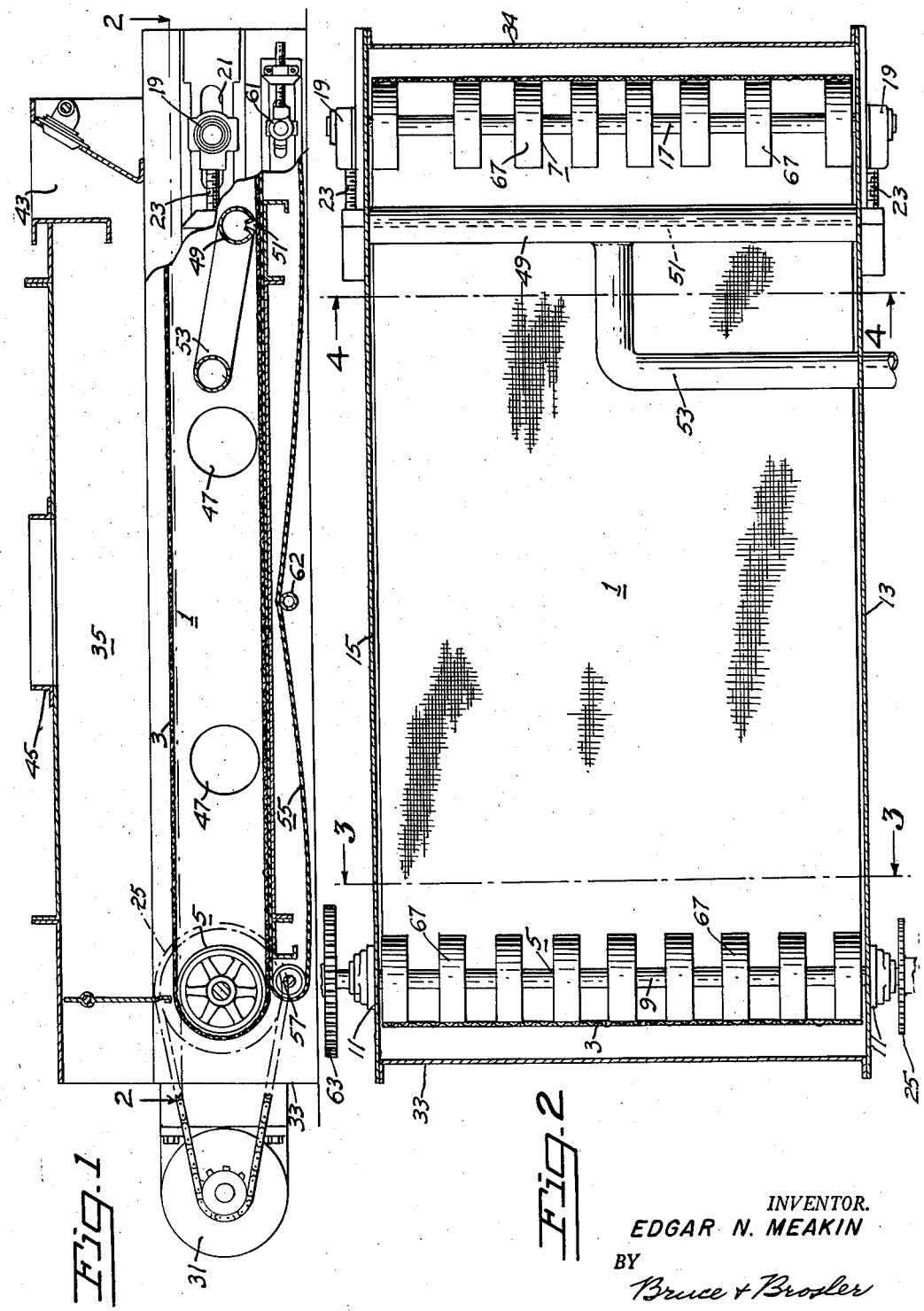

Filed June 29, 1956        2 Sheets-Sheet 2

INVENTOR.
EDGAR N. MEAKIN
BY
*Bruce & Brosler*
HIS ATTORNEYS

United States Patent Office 2,982,029
Patented May 2, 1961

2,982,029
HORIZONTAL COOLER

Edgar N. Meakin, 372 Roblar Ave., Hillsborough, Calif.

Filed June 29, 1956, Ser. No. 594,911

6 Claims. (Cl. 34—85)

My invention relates generally to the treatment of material and more particularly to a cooler of the horizontal type for cooling of pellets following discharge of the same from the mill in which they are formed.

Coolers of the horizontal type normally involve an endless screen belt having apertures sufficiently small to preclude loss of pellets therethrough, yet of a size to allow adequate flow of air through the belt and the pellets, to cool the pellets following discharge thereof from the mill. Pellets to be cooled are dumped on to the screen belt at one end in quantities sufficiently to form a layer from six to ten inches in depth, and are discharged at the other end of the belt. Cooling air forced through the upper pellet supporting section of the screen belt, passes through the layer of pellets to remove heat therefrom.

While possessing certain advantages over a vertical type cooler, principally in the conservation of head room, the horizontal type of cooler, as presently known, does present various problems, which could become serious from the viewpoint of successful operation of the device. Principally among these is the fact that fines present among the pellets invariably pass through the upper or pellet supporting section of the screen belt and settle down on the lower section. Such fines are carried along by the belt and often pile up against the pulley at the feed end thereof. Such pile-up, unless removed, can ultimately block the entire operation of the unit.

In addition, quite a bit of the fines escape from the lower section of the screen belt and collect in the bottom of the cooler, often piling up to a point where the lower section of the belt must actually drag itself up and over the pile thus formed. This tends to pack a lot of the fines into the openings in the belt, which promptly impedes flow of air through the belt and layer of pellets carried thereon, and consequently presents a serious maintenance problem.

Among the objects of the present invention are:

(1) To provide a novel and improved cooler of the horizontal type;

(2) To provide a novel and improved horizontal cooler employing an endless screen belt, the cooler being so constructed that fines passing through the screen belt are promptly removed;

(3) To provide a novel and improved horizontal cooler employing an endless screen belt, the cooler having provision for removing fines tending to pile up on the lower section of the belt and against the pulley at one end of the cooler;

(4) To provide a novel and improved horizontal cooler employing an endless screen belt, the cooler having provision for removing fines tending to collect and pile up beneath the lower section of the belt;

(5) To provide a novel and improved horizontal cooler employing an endless screen belt and having provision for discouraging clogging of the openings through such belt;

(6) To provide a novel and improved endless screen belt assembly which will not clog up in use.

Additional objects of my invention will be brought out in the following description of a preferred embodiment of the same taken in conjunction with the accompanying drawings, wherein Figure 1 is a side view in section of a cooler of the present invention;

Figure 2 is a view taken in the plane 2—2 of Figure 1;

Figure 3:
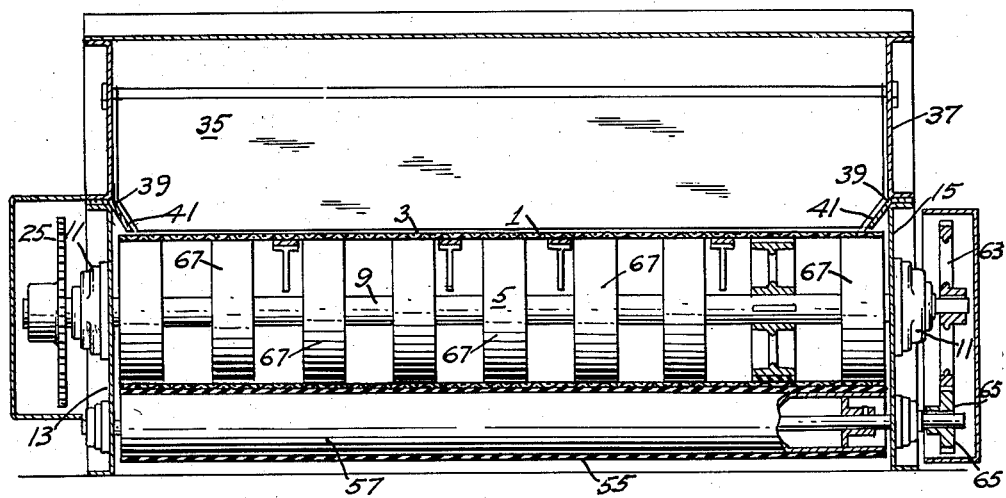
Figure 3 is a view taken in the plane 3—3 of Figure 2.
Figure 4:
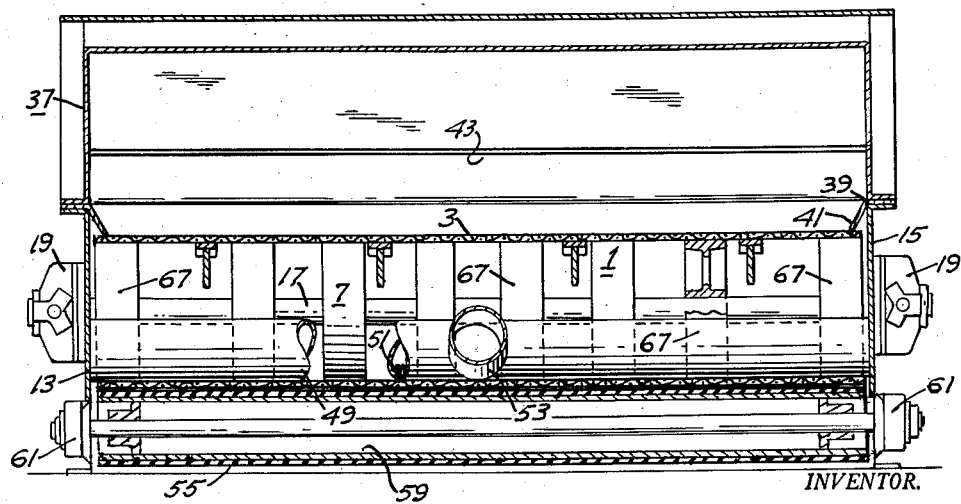
Figure 4 is a view taken in the plane 4—4 of Figure 2.

Referring to the drawings for details of my invention in its preferred form, the cooler employs an endless belt assembly 1 involving an endless belt 3 of screen material supported on end pulleys, one being a drive pulley 5 and the other an idler pulley 7, the drive pulley being rotatably mounted with its shaft 9 in end bearings 11 affixed to the outer surfaces of a pair of flanged side walls 13, 15. The idler pulley, on the other hand, has its shaft 17 journalled in bearings 19 which are slidably mounted on ways 21 provided in the side walls, and are adjustable on such ways by means of adjusting screws 23 to alter the tension of the belt.

On one end of the shaft of the drive pulley, there is mounted a sprocket 25 which is coupled by a drive chain 27 to a sprocket 29 of smaller diameter mounted on the shaft of a drive motor 31 supported on a flanged end wall 33 spanning the side walls. A similar end wall 34 spans the side walls at the opposite end thereof.

The aforementioned flanged side and end walls constitute the lower part of a housing 35 enclosing the endless screen belt assembly, such housing including an upper matching flanged section 37 mounted on the lower part with an insert 39 between the two having a flange 41 along each side wall directed downwardly to the upper section of the screen belt. These flanges act as guards to retain material from working off the side edges of the belt.

At the idler pulley end, the upper section includes a hopper 43 for receiving and directing material to the screen belt for treatment, in this particular case, to cool the same.

Air flow through the upper section of the screen belt is provided for by means of a duct takeoff 45 in the roof of the housing, preferably centrally thereof, and by forming in the side walls, a plurality of openings 47 intermediate the upper and lower sections of the screen belt. A suction fan coupled to the duct takeoff will serve to draw air through the side wall openings. The air must then pass through the upper section of the belt and through the layer of pellets carried thereon.

The structure thus far described is more or less conventional. It is with such type of structure that the problems previously discussed, are encountered. Any fines dropping through the upper section of the endless belt are apt to settle on the lower section thereof and be carried to the idler pulley where such material might accumulate and cause considerable difficulty. As a means of promptly and continually removing such material as may tend to accumulate against the idler pulley, I provide vacuum equipment which functions continually to withdraw such material and discharge it outside of the housing in any desirable manner. Such vacuum equipment may entail a closed ended pipe 49 disposed transversely of the housing in proximity to the idler pulley and close to the surface of the lower section of the screen belt. Such pipe has a slit 51 running longitudinally thereof in close proximity to the belt surface. A branch pipe 53 leading from the first pipe and out of the housing through a wall thereof for connection to a suction fan (not illustrated) provides for the removal and discharge of such material as is vacuumed from the lower section of the screen belt.

A certain portion of the fines landing on the lower portion of the screen belt, however, filter through the belt, and in the absence of provision for removing such fines, they will accumulate and ultimately pile up to a point where the lower section of the screen belt will be forced to drag itself over the pile of fines thereby causing not only resistance to movement of the belt, but will also cause the material to pack into the openings in the belt and clog such openings and thereby impede flow of air through the belt.

As one remedy for such condition, I provide a horizontal endless belt 55 of material such as rubber, which is impervious to such fines, and mount the same for operation below the screen belt in position to receive and carry away any such material as may thus filter through the screen belt.

The belt is supported on end pulleys, one of which is a drive pulley 57 located below the drive pulley of the screen belt, while the other is an idler pulley 59 disposed below the idler pulley of the screen belt, and like the idler pulley of the screen belt, is mounted in adjustable bearings 61 for tensioning purposes. A second idler pulley 62, intermediate the ends of the belt supports the lower stretch of the belt to avoid sagging thereof.

The drive pulley of the endless rubber belt is drive coupled to the drive pulley 5 of the screen belt by means of meshing gears 63 and 65, one on the free end of the drive pulley for the screen belt and one on the corresponding end of the drive pulley for the rubber belt. The gear ratio is preferably so selected as to cause linear movement of the rubber belt to substantially correspond to the linear movement of the screen belt, whereby the upper section of the rubber belt constitutes in effect a movable bottom for the cooler and any fines filtering through the screen belt and landing on the rubber belt, will travel along with the screen belt and be discharged at one end of the unit.

As an added protection against clogging of the screen belt, the pulleys for the screen belt are of unique design and construction. Instead of being single pulleys and continuous throughout their length, each of the pulleys is made up of a plurality of pulley sections 67 mounted in spaced relationship to each other on the pulley shaft. Except for the end pulley sections, the intermediate pulley sections on the shaft of the drive pulley are positioned out of alignment with the corresponding pulley sections on the idler pulley shaft. Such relationship serves to stimulate lateral flexings of the screen belt during longitudinal travel thereof, and such flexings of the screen belt in turn tend to dislodge any material clogging the openings therein.

The horizontal cooler of the present invention, by reason of the features described above, fulfills all the objects of the invention as previously outlined, but what is quite important in a mechanism of the aforementioned type, such results can be accomplished in a structure which requires but a minimum of height, which becomes a very important factor in many installations.

In terming the device of the present invention, a "cooler," it is apparent that the same device may be employed for heating, drying or to add moisture in the treatment of material. The term "cooler" is not to be deemed limiting, but is to be considered as indicative of one use of the invention.

While I have disclosed my invention in its preferred form, the same is subject to alteration and modification without departing from the underlying principles involved, and I accordingly do not desire to be limited in my protection to the specific details illustrated and described by me except as may be necessitated by the appended claims.

I claim:

1. In a substantially horizontally disposed endless belt assembly, an endless belt of screen material, end pulleys for supporting said belt at each end and enclosed thereby, said end pulleys each comprising a plurality of pulley sections on a common axis and spaced transversely of said belt, with certain of the sections of one end pulley being out of alignment with corresponding pulley sections of the other end pulley whereby to stimulate lateral flexings from end pulley to end pulley throughout the upper stretch of said belt of screen material during longitudinal travel thereof.

2. In a substantially horizontally disposed endless belt assembly, an endless belt of screen material, end pulleys for supporting said belt at each end and enclosed thereby, said end pulleys each comprising a plurality of independent pulley sections on a common axis and spaced transversely of said belt, with certain of the sections of one end pulley intermediate the ends sections being out of alignment with corresponding intermediate pulley sections of the other end pulley whereby to stimulate lateral flexings from end pulley to end pulley throughout the upper stretch of said belt of screen material during longitudinal travel thereof.

3. In combination, a substantially horizontal endless belt of screen material, end pulleys for supporting the same and creating an upper belt section and a lower belt section; said end pulleys each comprising a plurality of pulley sections on a common axis and spaced transversely of said belt, with certain of the sections of one end pulley intermediate the end sections being out of alignment with corresponding intermediate pulley sections of the other end pulley whereby to stimulate lateral flexings of said belt of screen material during longitudinal travel thereof.

4. In combination, a substantially horizontal endless belt of screen material, end pulleys for supporting the same and creating an upper belt section and a lower belt section; means for driving a material treating medium through the upper section of said screen belt; means for continually removing fines settling on the lower screen belt section and carried thereby toward one of said end pulleys; and means for carrying off fines passing through the screen openings in said lower screen belt section, said means including a substantially horizontal belt of material impervious to such fines, disposed below said endless screen belt in position to receive and carry away any such fines.

5. In combination, a substantially horizontal endless belt of screen material, end pulleys for supporting the same and creating an upper belt section and a lower belt section; means for driving a material treating medium through the upper section of said screen belt; means for continually removing fines settling on the lower screen belt section and carried thereby toward one of said end pulleys, said means including a closed ended pipe disposed transversely of said lower belt section adjacent said end pulley and having a longitudinal slit in close proximity to the upper surface of said lower belt section, and a second pipe leading from said first pipe for connection to suction apparatus; and means for carrying off fines passing through the screen openings in said lower screen belt section, said means including a substantially horizontal belt of material impervious to such fines, disposed below said endless screen belt in position to receive and carry away any such fines.

6. In combination, a substantially horizontal endless belt of screen material, end pulleys for supporting the same and creating an upper belt section and a lower belt section, said end pulleys each comprising a plurality of pulley sections on a common axis and spaced transversely of said belt, with certain of the sections of one end pulley being out of alignment with corresponding pulley sections of the other end pulley, whereby to stimulate lateral flexings of said belt during longitudinal travel thereof; means for driving a cooling medium through the upper section of said screen belt, said means including a housing substantially enclosing said endless belt and having openings in the sides and top thereof; means for continually removing fines settling on the lower screen belt section and carried thereby toward one of said end pulleys, said means including a closed ended pipe disposed transversely of said lower belt section adjacent said end pulley and having a longitudinal slit in close proximity to the upper surface of said lower belt section, and a second pipe leading from said first pipe out of said housing through a wall thereof for connection to suction apparatus, and means for carrying off fines passing through the screen openings in said lower screen belt section, said means including a substantially horizontal belt of material impervious to such fines, disposed below said endless screen belt in position to receive and carry away any such fines.

References Cited in the file of this patent

UNITED STATES PATENTS

| | | |
|---|---|---|
| 853,782 | Hall | May 14, 1907 |
| 1,235,027 | Harrison | July 31, 1917 |
| 1,250,427 | Campbell | Dec. 18, 1917 |
| 2,363,037 | Arnold | Nov. 21, 1944 |
| 2,391,178 | McKnight | Dec. 18, 1945 |
| 2,565,576 | Runton | Aug. 28, 1951 |
| 2,620,064 | Thys | Dec. 2, 1952 |
| 2,644,575 | Mercier | July 7, 1953 |